US008261446B2

(12) United States Patent
Imoehl et al.

(10) Patent No.: US 8,261,446 B2

(45) Date of Patent: *Sep. 11, 2012

(54) INJECTOR SEAT THAT INCLUDES A COINED SEAL BAND WITH RADIUS

(75) Inventors: William J. Imoehl, Williamsburg, VA (US); Sidney Barry Judkins, Newport News, VA (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 41 days.

This patent is subject to a terminal disclaimer.

(21) Appl. No.: 12/843,903

(22) Filed: Jul. 27, 2010

(65) Prior Publication Data

US 2010/0287774 A1 Nov. 18, 2010

Related U.S. Application Data

(63) Continuation of application No. 12/219,881, filed on Jul. 30, 2008, now Pat. No. 7,832,661, which is a continuation-in-part of application No. 10/951,387, filed on Sep. 28, 2004, now Pat. No. 7,832,660.

(60) Provisional application No. 60/506,823, filed on Sep. 29, 2003.

(51) Int. Cl.

| | |
|---|---|
| ***B23P 17/00*** | (2006.01) |
| ***F02M 61/00*** | (2006.01) |
| ***F16K 31/02*** | (2006.01) |

(52) U.S. Cl. ........... 29/890.122; 29/890.12; 239/533.12; 251/129.14

(58) Field of Classification Search ............... 29/890.22, 29/888.44, 888.441; 239/533.12, 585.1; 251/129.14

See application file for complete search history.

(56) References Cited

U.S. PATENT DOCUMENTS

| | | | | |
|---|---|---|---|---|
| 2,273,830 | A | 2/1942 | Brierly | |
| 4,030,668 | A | 6/1977 | Kiwior | |
| 4,101,074 | A | 7/1978 | Kiwior | |
| 4,446,837 | A | 5/1984 | Elpern | |
| 4,771,948 | A | 9/1988 | Furukawa et al. | |
| 5,058,810 | A | 10/1991 | Bonfiglioli et al. | |
| 5,081,766 | A * | 1/1992 | Kellum et al. | 29/890.13 |

(Continued)

FOREIGN PATENT DOCUMENTS

EP 1138936 10/2001

(Continued)

OTHER PUBLICATIONS

Office Action and Translation in corresponding Japanese Patent Application No. 2006-528314 of parent issued on Sep. 30, 2009 (dispatched on Oct. 6, 2009).

*Primary Examiner* — Alexander P Taousakis

(57) ABSTRACT

A fuel injector apparatus and method is provided for use in a fuel injection system of an internal combustion engine that includes a body, a valve seat, closure member, and an orifice plate. The valve seat comprises the intersection of two angled surfaces with a radius before assembly of the fuel injector. During assembly of the fuel injector, a member presses against the radius edge of the sealing surface of the valve seat to create an oblique third sealing surface or sealing band that is coined into the valve seat. The sealing band provides an improved seal between the valve closure member and the valve seat which operates to prevent leakages of fuel in the fuel injector.

12 Claims, 6 Drawing Sheets

U.S. PATENT DOCUMENTS

| | | | | |
|---|---|---|---|---|
| 5,409,169 | A | 4/1995 | Saikalis et al. | |
| 5,871,157 | A | 2/1999 | Fukutomi et al. | |
| 5,915,591 | A * | 6/1999 | Erickson et al. | 222/1 |
| 5,921,473 | A | 7/1999 | Romann | |
| 6,035,532 | A * | 3/2000 | Earnhardt | 29/890.122 |
| 6,039,271 | A | 3/2000 | Reiter | |
| 6,105,610 | A * | 8/2000 | Watkins et al. | 137/516.29 |
| 6,170,763 | B1 | 1/2001 | Fuchs et al. | |
| 6,422,487 | B1 | 7/2002 | Imoehl | |
| 6,502,769 | B2 | 1/2003 | Imoehl | |
| 6,526,656 | B2 | 3/2003 | Imoehl | |
| 6,834,845 | B2 * | 12/2004 | Finke et al. | 251/129.14 |
| 7,434,752 | B2 | 10/2008 | Matsumoto et al. | |
| 2002/0050536 | A1 * | 5/2002 | Imoehl | 239/533.12 |
| 2004/0056115 | A1 * | 3/2004 | Peterson, Jr. | 239/533.2 |
| 2005/0067508 | A1 | 3/2005 | Imoehl | |
| 2010/0287774 | A1 * | 11/2010 | Imoehl et al. | 29/890.122 |

FOREIGN PATENT DOCUMENTS

| | | | |
|---|---|---|---|
| FR | 981.999 | | 6/1951 |
| GB | 1537207 | | 12/1978 |
| JP | 9042114 | A | 2/1997 |
| JP | 2002081359 | A | 3/2002 |
| JP | 2002257004 | A | 9/2002 |

* cited by examiner

INJECTOR SEAT THAT INCLUDES A COINED SEAL BAND WITH RADIUS

CROSS-REFERENCES TO RELATED APPLICATIONS

This application is a continuation of U.S. application Ser. No. 12/219,881, filed on 30 Jul. 2008, now U.S. Pat. No. 7,832,661 which is a continuation-in-part of U.S. application Ser. No. 10/951,387, which was filed on 28 Sep. 2004, now U.S. Pat. No. 7,832,660 claiming priority to provisional Patent Application No. 60/506,823, filed 29 Sep. 2003, now abandoned.

FIELD OF INVENTION

The present invention relates to a method and apparatus used to coin a valve seat with a radius in a fuel injector during assembly of the fuel injector to improve leakage and seating between the closure member and the valve seat in the fuel injector.

BACKGROUND

The metal to metal seal formed in a valve between a valve closure member and a valve seat determines the accuracy at which the fluid flowing through the valve is controlled. Leakage results when the surfaces between the valve closure and the valve seat do not mate correctly. This leakage is detrimental in systems where precise flow control is desired. Similarly, the amount of gasoline leakage from a fuel injector has an effect on evaporative emissions. Government legislation has reduced the amount of automotive evaporative emissions so customers are requiring more stringent fuel injector leakage.

A valve seat is typically a ground hardened conical seat (Rc>55). The valve closure member is also of a similar material and hardness. This conical valve seat and valve closure member must have low roundness in order to produce a tight seal to prevent leakage. One method used to produce low seat roundness resulting in a tight seal between the closure member and the valve seat is grinding. Grinding greatly influences the accuracy and reliability of the fluid valve, however, the roundness tolerances for low leakage rates are in sub micron range. As a result, grinding becomes an extremely expensive manufacturing procedure. Such activities will increase manufacturing costs and therefore there exists a need for alternate procedures that are less costly and desirable.

Another method used for manufacturing an automotive part involves machining a valve seat with sharp interrupted edges. This process does not control the tooling at the change of angle as the part continues to rotate leaving a portion of the valve seat with an unknown or undefined machined area. This undefined machined area may add variation to the edge condition which in turn will add variation to the coined area causing the inconsistent leak rates from part to part.

Another method for manufacturing a closure member and valve seat applies an axial compressive load to force the closure member against the seat, coining the closure member to the seat. The method described in U.S. Pat. No. 5,081,766 produces a valve assembly that is capable of accurate and reliable fluid metering yet avoids expensive tolerance control on surface finishing and part dimensioning. The method disclosed by this patent involves the inclusion of an additional step in the assembly process, a coining step, but eliminates the necessity for stricter tolerances on surface finish and part dimensioning. Accordingly, reconfiguration of existing manufacturing equipment and processes requires merely adding the coining step to reduced leakage through the injector. This coining step however does not involve the use of a coining die to coin the part. Rather the coining step involves the application of axial compressive load to force a rounded distal end of the closure member against a conical surface of the seat so that the coining action occurs as an annular zone of surface contact between the closure member and the seat. The force of application is preferably conducted in a particular manner so that the closure member is neither irreversibly bent or buckled by the coining step. This step is conducted during the assembly process so that neither the solenoid nor the spring which are the operating mechanism in the completed injector has an influence on the result of coining.

It would be beneficial to develop a method and apparatus to form a better seal between the closure member and the seat using part materials and initial geometry configuration when a closure member first contacts valve seat during assembly of the fuel injector to assure improved seal and manufacturing cost savings.

BRIEF SUMMARY OF THE INVENTION

In accordance with one aspect of this invention, a fuel injector for an internal combustion engine includes a body having an inlet, an outlet and a longitudinal axis entering therethrough. A valve assembly regulates the flow of fuel to a combustion chamber wherein a closure member rests on a valve seat in a closed position to prohibit the flow of fuel. The valve seat has an upstream surface meeting a down stream surface to form a radius edge. A sealing band is coined into the radius edge upon the axial movement downwards of an assembly member onto a sealing surface of the valve seat. An orifice disk has at least one orifice for allowing fuel to pass from the valve assembly to the combustion chamber when the closure member is biased into an open position.

In accordance with another aspect of this invention, a method of lowering leakage rates in a fuel injector is provided. The fuel injector has a body with a first end and a second end disposed along a longitudinal axis, the body having an inlet, an outlet and a longitudinal axis entering therethrough; a valve assembly regulating the flow of fuel to a combustion chamber wherein a closure member rests on a valve seat in a closed position that prohibits the flow of fuel; an orifice disk having at least one orifice for allowing fuel to pass from valve assembly to the combustion chamber when closure member is biased into an open position. The method provides a sealing surface of the valve seat having an upstream surface meeting a down stream surface to form a radius edge. The sealing surface of the valve seat is coined to create a sealing band onto the radius edge prior to assembly of the fuel injector. A closure member is displaced axially downwards onto the sealing surface of the valve seat to seal the valve seat. The fuel is directed to flow towards the longitudinal axis. The fuel is diverted through the at least one orifice of the orifice disk.

In accordance with yet another aspect of this invention, a method of manufacturing a valve seat in a fuel injector is provided. The fuel injector has a body with a first end and a second end disposed along a longitudinal axis, the body having an inlet, an outlet and a longitudinal axis entering therethrough; a valve assembly regulating the flow of fuel to a combustion chamber wherein a closure member rests on a valve seat in a closed position that prohibits the flow of fuel; an orifice disk having at least one orifice for allowing fuel to pass from valve assembly to the combustion chamber when closure member is biased into an open position. The method machines a sealing surface of the valve seat having an upstream surface meeting a down stream surface to form a radius edge. A lower body of the fuel injector is assembled. The sealing surface of the valve seat is coined to create a scaling band onto the radius edge prior to assembly of the fuel injector. A closure member is displaced axially downwards onto the sealing band of the valve seat to seal the valve seat.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The accompanying drawings, which are incorporated herein and constitute part of this specification, illustrate the presently preferred embodiment of the invention, and, together with the general description given above and the detailed description given below, serve to explain features of the invention. In the drawings.

DETAILED DESCRIPTION OF THE DRAWINGS

Figure 1:
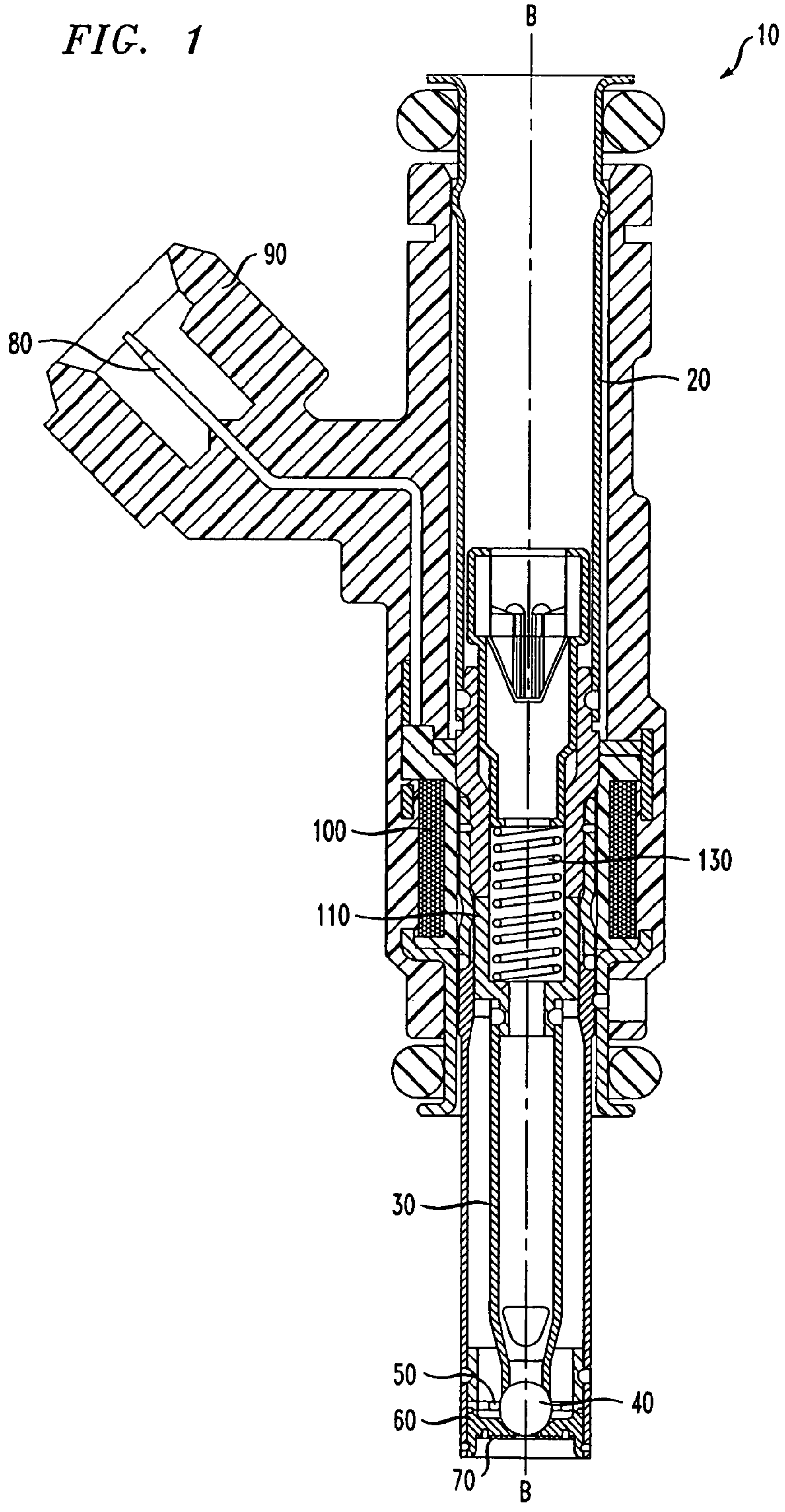
FIG. 1 shows a cross sectional view of a preferred embodiment of the fuel injector.

Referring to FIG. 1, a solenoid fuel injector 10 comprising a generally tubular metal body 20 having a longitudinal axis B-B extending therethrough, an elongated metal armature tube 30 disposed coaxial with axis within metal body 20 where downstream end of armature tube 30 is affixed to a closure member 40, guide member 50, an annular valve seat 60 for mating with closure member 40, and a metal orifice disc member 70 for dispensing a quantity of fuel that is to be combusted in an internal combustion engine (not shown).

The solenoid actuated fuel injector 10 is electromagnetically actuated. The electromagnetic coil 100 can be energized, thereby generating magnetic flux in the magnetic circuit. The magnetic flux moves armature 110, armature tube 30, and closure member 40 preferably along the axis B-B axis. A terminal 80 and an electrical harness connector portion 90 can engage a mating connector, e.g., part of a vehicle wiring harness (not shown), to facilitate connecting the solenoid actuated fuel injector 10 to an electrical power supply (not shown) for energizing the electromagnetic coil 100. An armature 110 is used to axially move the armature tube 30 and closure member 40 and open it opposite spring resilient member 130 or to close the fuel injector 10. The armature 110 is affixed to an upstream end of the valve armature tube 30 by weld and shares the longitudinal central axis B-B. The electromagnetic coil 100 encircles armature 110.

Figure 2A:
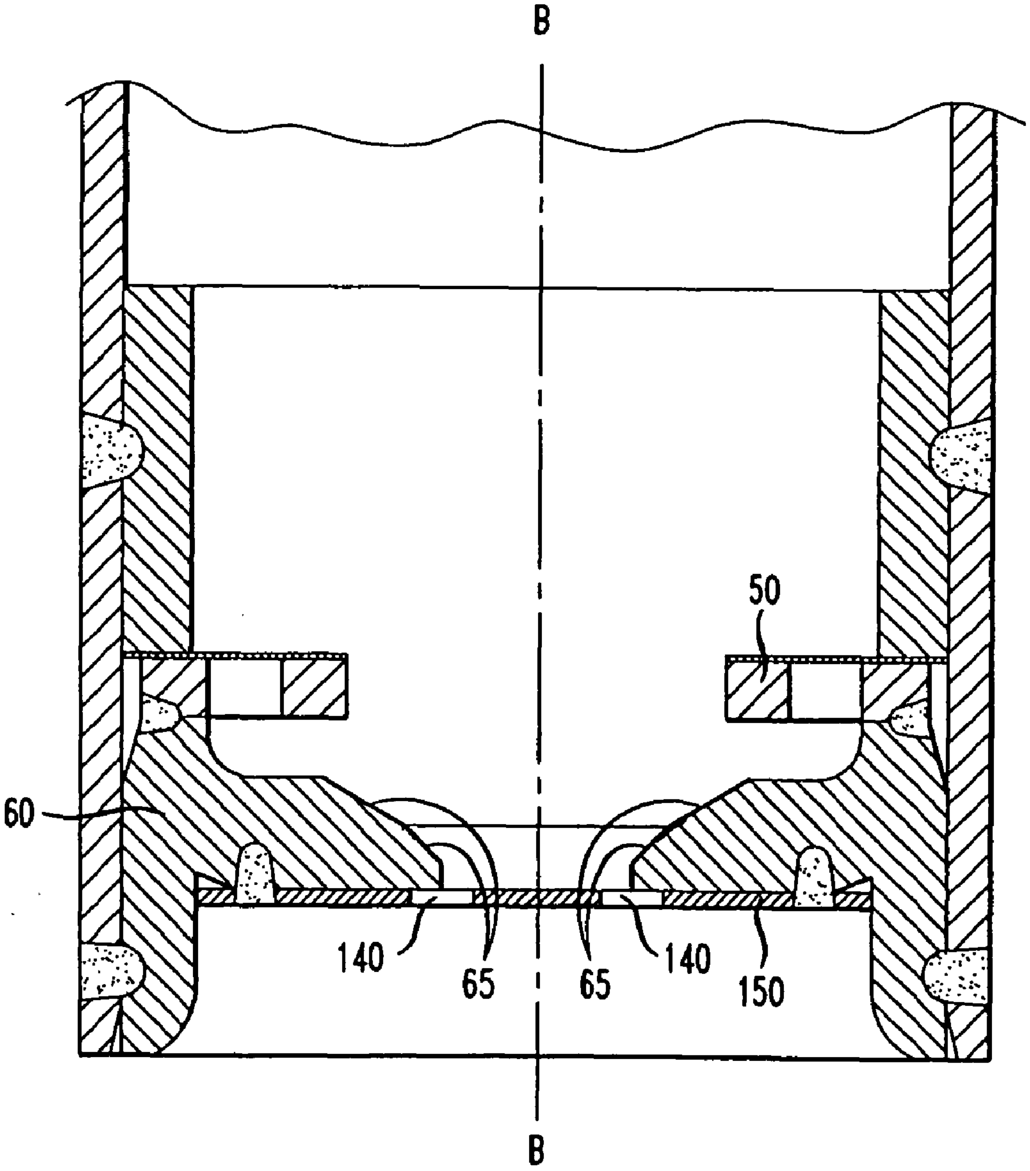
FIG. 2*a* shows a cross sectional view of the seat assembly prior to coining with the radius edge.
Figure 3:
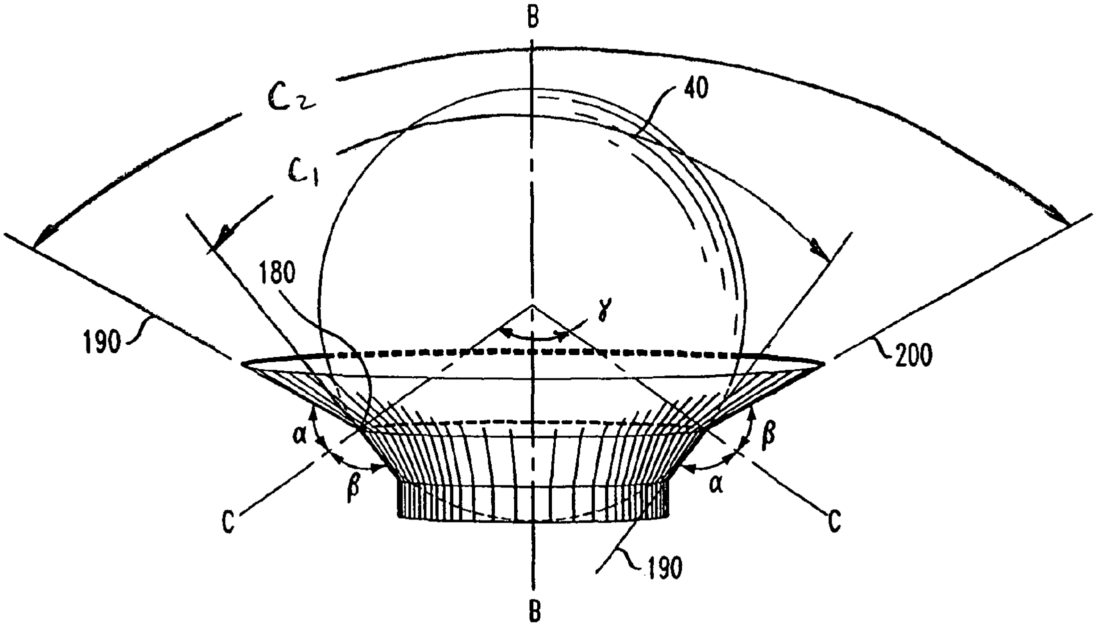
FIG. 3 shows a closure member resting on a valve seat prior to coining.
Figure 4:
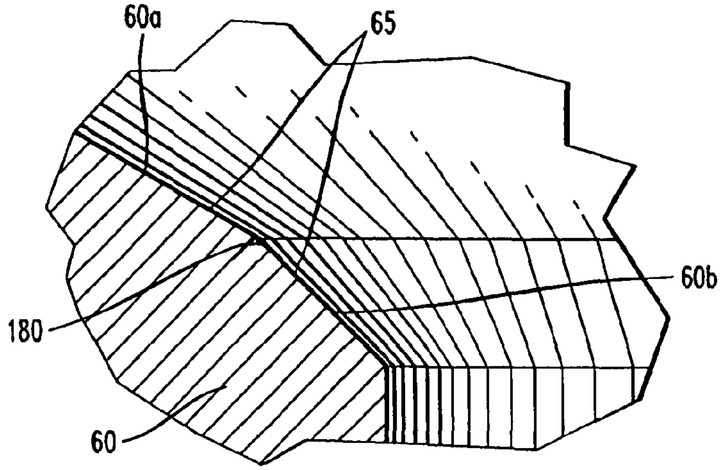
FIG. 4 shows a magnified view of the sealing surface with radius edge before coining.

Referring to FIGS. 2*a*, 3, and 4, the guide member 50 has a central circular guide hole through which the closure member 40 of armature tube 30 passes and is guided through during axial movement of the armature tube 30. In the downstream end, valve seat 60 generally includes a frusto conical surface which extends generally downstream and toward a longitudinal axis B-B. Preferably, the valve seat 60 is constructed of a metal such as stainless steel. A downstream end of closure member 40 has a convex surface that engages the conical surface of the valve seat 60 when the armature tube 30 is in closed position. Preferably the closure member 40 and armature tube 30 are constructed of metal such as stainless steel.

Referring to FIG. 3, in the preferred embodiment, angle alpha is equal to angle beta to obtain increased coining efficiency. Keeping these angles equal moves the maximum amount of the radius material for a given width of sealing band 170 during coining. Others skilled in the art may choose not to keep angle alpha and beta equal and still have a functional design. The selection of the alpha and beta angles is based on the desired diameter of sealing band 170 which affects the performance of fuel injector 10. The area of the circle defined by the sealing band 170 is the area on which the fuel pressure acts and this area defines one force that opposes the movement of the tube 30 and closure member 40. Therefore the size of the sealing band 170 affects the opening time, the minimum operating voltage and other parameters. The preferred embodiment uses a diameter of sealing band 170 equal to 1.83 mm. The other parameter that affects the choice of diameter of sealing band 170 is coining efficiency. For a perfect imprint of a ball on a horizontal flat plate, one would apply the force perpendicularly to the plate, in the vertical direction. A force in any other direction tends to plow the material and leaves an imperfect impression. In this flat plane example above, the critical angle to monitor is gamma which is zero degrees in this case. As illustrated in FIG. 3, angle gamma is defined by two line segments each going through the center of the closure member 40 and the apex of the radius edge 180. These line segments bi-sect the new angle defined by angle alpha+angle beta. In a preferred embodiment, with included cone angles of 90° (angle $C_1$) and 120° (angle $C_2$), angle gamma equals 75°. If the valve seat 60 is being ground rather than coined, then the preferred gamma angle is 90°. If the valve seat 60 is being coined, then the preferred gamma angle should be minimized. The limits on angle gamma are defined by the size of the center aperture of valve seat 60. As the area of sealing band 170 progressively decreases, angle gamma decreases based on the durability requirements of higher stress and the ratio of fuel injector flow sensitivity to lift. The practical lower limit (due to material stress, durability, etc.) of angle gamma when valve seat 60 is being coined is 60°. Therefore, during the coining process, the preferred range of angle gamma spans from 60° to 75° depending on the desired diameter of sealing band 170. Therefore, a preferred gamma of 60° will include cone angles of 135° and 105°. Note that alfa=beta=82.5°.

Referring to FIG. 4, the sealing surface 65 of valve seat 60 includes a first seat surface 60*a* (upper cone) having a range of included angle $C_2$ of 120°-135°, which slopes radially inwardly and downwardly toward the orifice disk 150 and which is also oblique to the longitudinal axis B-B. The valve seat 60 also includes a second seat surface 60*b* (lower cone) having a range of included angle $C_1$ of 90°-105° whose downstream surface defines a gap between the closure member and the orifice disk 150. The terms "inwardly" and "outwardly" refer to directions toward and away from, respectively, the longitudinal axis B-B. The gap between the closure member and the orifice disk 150 is disposed downstream the first and second seat surfaces 60*a*, 60*b* of the valve seat 60. The radius edge 180, sits between the first surface 60*a* and second surface 60*b* of the valve seat 60. A radius of the radius edge ranges from 0.005 mm to 0.150 mm and is preferably about 0.020 mm.

Also referring to FIGS. 3 and 4, before coining the geometry includes a radius edge 180 of valve seat 60 formed by two intersecting cones of different angles $C_1$ and $C_2$. The radius edge 180 joins first seat surface 60*a* and second seat surface 60*b*. A line C bisecting the included angle (alpha+beta) of the radius edge 180 goes through the center of the closure member 40. This geometry gives the highest ratio of coining depth to sealing band width.

During assembly (not shown) of the fuel injector, the valve seat 60 is coined as part of a valve body assembly. The valve body assembly is held seat up on a pallet that moves through the assembly equipment with a "walking beam". A carbide ball is used to coin the valve seat 60. At the assembly stage, the carbide coining ball is held on the end of a pin with vacuum. The pin with the carbide ball on the end is raised up through the pallet and into the valve body assembly. The coining ball contacts the valve seat 60 and raises the valve body assembly out of the pallet. The pin with the carbide ball and valve body assembly continue to move until it reaches (without touching) a stop and stops. The pin is then moved slowly and sandwiches the valve seat 60 between the carbide ball and the flat stop. The pin continues to move until the target coining force is reached. The pin then moves back down, placing the valve body assembly on the pallet. The pallet indexes to the next station and the process is repeated. If multiple repetitions are used, the pin moves down until the valve seat 60 is just free of the stop, then is moved back up for the next application of coining force. Finally, once the coining process is compete, the valve seat 60 moves down until the valve body assembly is back in the pallet. During this process, the carbide ball does elastically deform during the repetitive hits but does not permanently deform.

Figure 2B:
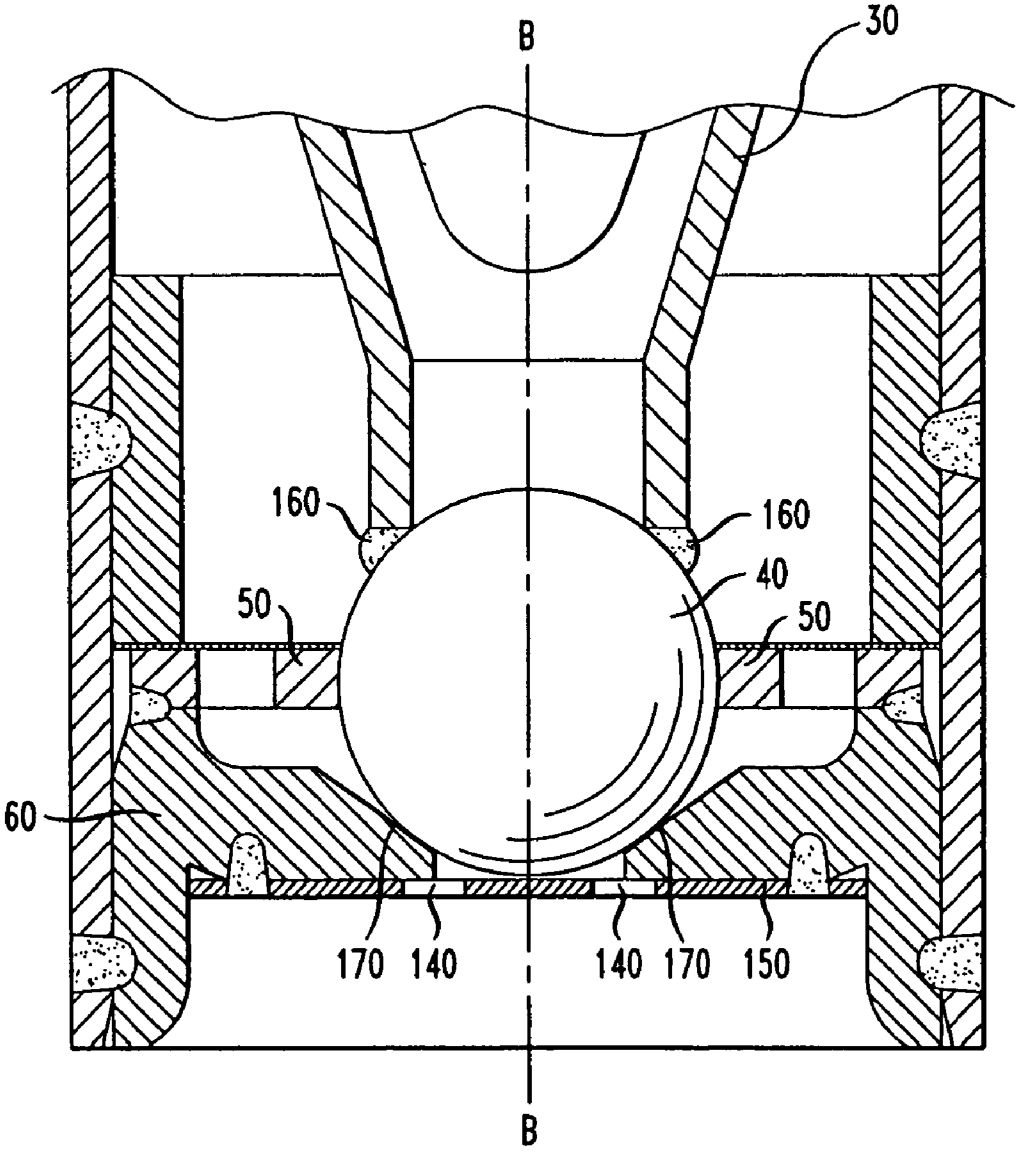
FIG. 2*b* shows a cross section view of the closure member and seat assembly.
Figure 2C:
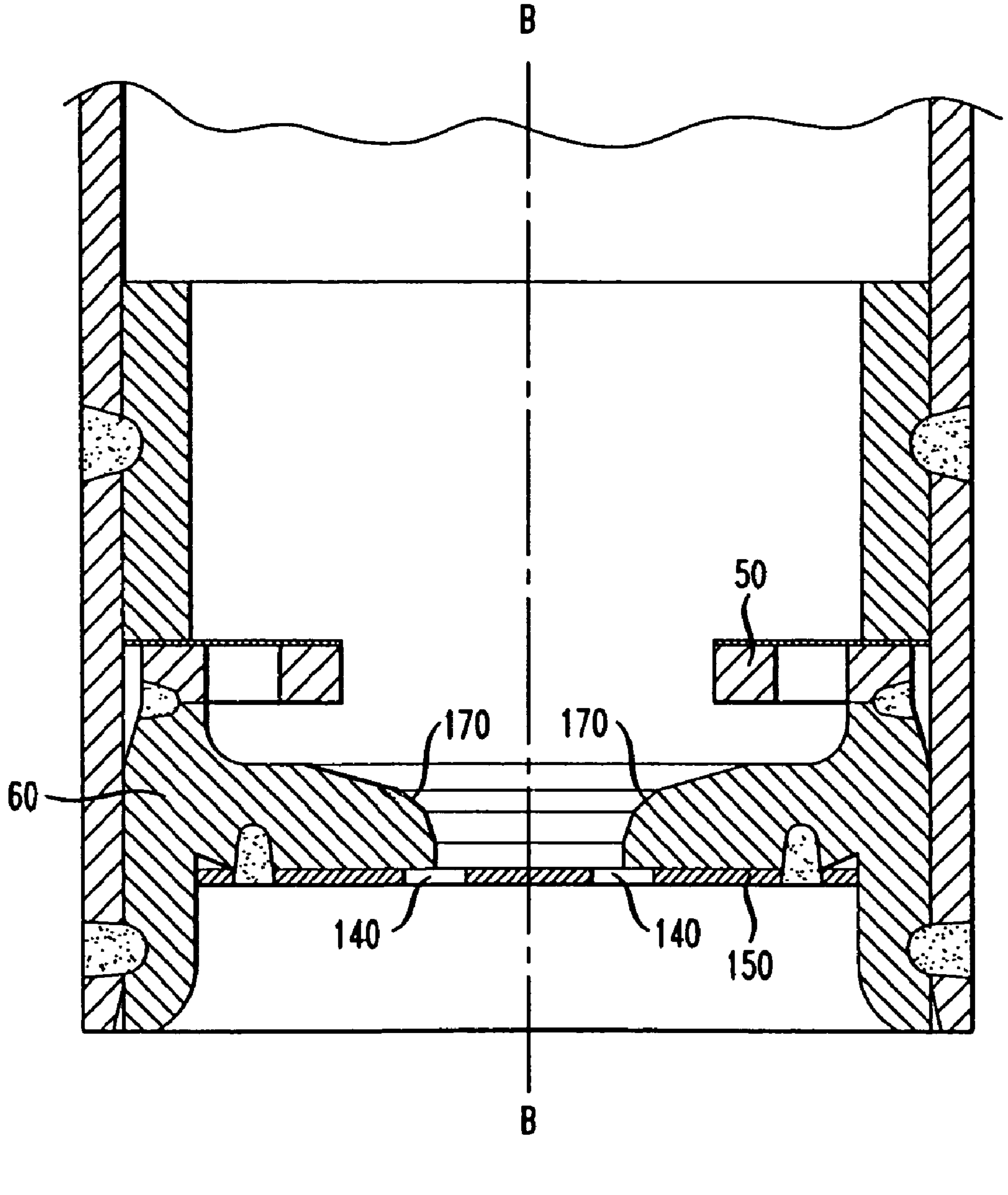
FIG. 2*c* is a cross section view of the seat assembly after coining.
Figure 2D:
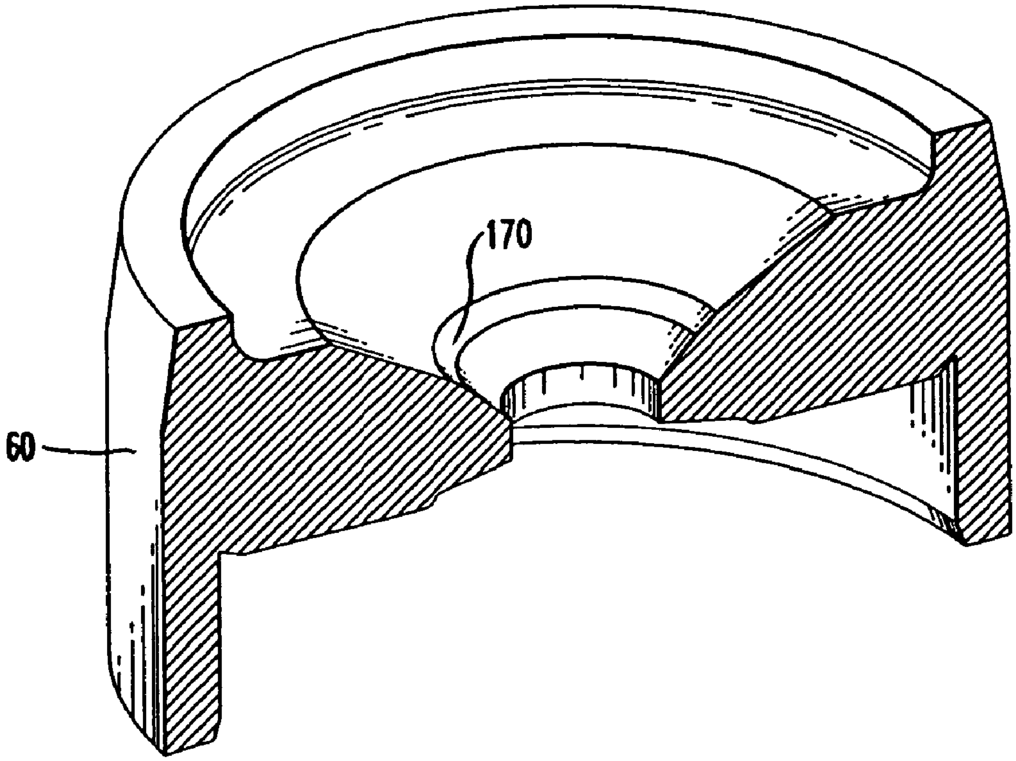
FIG. 2*d* is a perspective view, partially in section of the seat assembly after coining.

The carbide coining ball presses against the radius edge 180 portion of the valve seat 60, and coins a third oblique surface or sealing band 170 into sealing surface 65 of the valve seat 60. Referring to FIG. 2*b*, this new sealing band 170 is located on a virtual circle that defines a sealing diameter about the longitudinal axis B. In the closed position, the closure member 40 prevents fuel flow through the valve seat 60. In the open position, the spherical tip of the closure member 40 does not contact the sealing band 170 of the valve seat 60, and thus the closure member 40 permits flow through the valve seat 60.

As mentioned above, the armature 110, armature tube 30, and closure member 40 are axially reciprocally displaced toward and away from the valve seat 60. Contact between the convex surface of the closure member 40 and the frusto conical surface of the valve seat 60 form a seal to block the flow of fluid through the orifice 140. The effectiveness of the seal is determined by the tightness of the contact between the convex surface of the closure member 40 and the frusto conical surface of the valve seat 60. Surface irregularities and misalignment between the convex surface and frusto conical surface have adverse effects on the contact tightness especially where the contact is metal to metal. To overcome these problems, the invention uses coining to remove some of the irregularities in the valve seat 60, thus improving the seal. The assembly process of coining creates a sealing band 170 of the radius edge 180 of the valve seat 60 and is used to remove some of the irregularities in the valve seat 60 which improves the seal. The formation of a sealing band 170 on the radius edge 180 of the valve seat 60 through coining also serves to stabilize wear on the seat-needle interface by increasing the contact area between the closure member 40 and the valve seat 60 and thus reducing stress. The coining process serves to form a seal by making an oblique third contact surface that is coin fitted to the geometry of the outer surface of the valve closure member 40. As a result, the leakage rates of the sealing band 170 are reduced.

The closure member 40 is disposed along the longitudinal axis B-B, and is movable along a plurality of positions. The closure member 40 includes a generally spherical tip, and the closure member 40 can be a needle-type or may be a ball-type assembly. The plurality of positions includes an open position, (not shown) and a closed position as shown in FIG. 2*b*. The closure member 40 can be movable between a first position, so as to be in a closed configuration, and a second position so as to be in an open configuration (not shown). In the closed configuration, the closure member 40 contiguously engages the sealing band 170 of valve seat 60 to prevent fluid flow through the orifice 140 of orifice disc 150. In the open configuration, the closure member 40 is spaced from the sealing band 170 of the valve seat 60 so as to permit fluid flow through the orifice 140 via a gap between the closure member 40 and the sealing band 170 of the valve seat 60. In order to ensure a positive seal at the closure member 40 and sealing band 170 of valve seat 60 interface when in the closed configuration, closure member 40 can be attached to armature tube 30 by welds 160 and biased by a spring resilient member 130 so as to sealingly engage the sealing band 170 of the valve seat 60. Welds 160 can be internally formed between the junction of the armature tube 30 and the closure member 40. To achieve different spray patterns or to ensure a large volume of fuel injected relative to a low injector lift height, it is preferred that the spherical closure member 40 can be in the form of a sphere. Others skilled in the art may choose to select a valve closure member 40 shaped as a truncated sphere.

A valve assembly in fuel injector 10 traditionally includes a metal to metal seal between the moving armature assembly and a valve seat 60. An armature assembly with a closure member 40 being held against the sealing band 170 surface of valve seat 60 by the spring resilient member 130, forms the seal. The contact area between the valve seat 60 and the closure member 40 is theoretically a circular band with a radius. Any irregularities or out of roundness conditions of either the valve seat 60 or closure member 40 cause the seal to leak. Coining or deforming the sealing band 170 of the seat by either an impact on a closure member 40 or a carbide coining ball held against the valve seat 60 or by a static force on the closure member 40 or carbide coining ball held against the valve seat 60 can be used to remove some of the irregularities in the valve seat 60, thus improving the seal. The formation of a sealing band 170 on the valve seat 60 through coining generally 1-5 presses or hits also serves to stabilize wear on the seat-needle interface by increasing the contact area and thus reducing surface stresses. It is preferred to construct a sealing band 170 of valve seat 60 with widths ranging from 0.05-0.20 mm.

In the preferred embodiment, coining depth should be greater than the amount of surface finish irregularities and roundness irregularities added together. The amount of irregularities depends on the manufacturing process. In general the more expensive the process, the less coining depth is required to remove the effect of the irregularities. Therefore it is important to use an inexpensive process and increase coining depth. The coining width is a function of the geometry of the surface being coined and the depth of the coining band. The width or surface area of the sealing band 170 is constrained by the range known to provide the best durability performance requirements of the fuel injector. The depth which is controlled by the geometry of the radius edge 180 should be at least enough to remove the irregularities preventing a perfect seal. For example, if the sealing diameter is decreased and the sealing band width is decreased, the fuel injector will enjoy improved leak rates due to the reduction of surface area of the sealing band 170 thereby increasing the stress or pressure on the sealing band 170. However, the increased stress also causes the sealing band 170 to wear more quickly, decreasing the durability of the part. Therefore, there is a minimum surface area of the sealing band 170 required for durability. A typical turning process will yield a roundness of 0.004 mm and a surface finish on the order of 0.001 mm. Therefore, the coining depth required to perfect the seal is about 0.005 mm. If the surface is ground, the roundness is typically less than 0.0008 mm and surface finish less than 0.0002 mm which would require theoretical coining depth of 0.001 mm. When a 3 mm closure member 40 is coined into a 90 degree conical seat 60 to form a band width of 0.130 mm, the depth is theoretically 0.0014 mm depth to width ratio of 0.011. Therefore this surface would require grinding to form a seal. The geometry embodied in this invention makes coining much more efficient. With the geometry of the prototypes, coining depth is over 0.010 mm for a 0.130 width allowing a seal on seats manufactured by turning or machining with a lathe. The much higher ratio 0.08 of depth to width constitutes an advantage over current methods The higher depth to width ratio is afforded by coining a radius edge 180 as shown in FIG. 3. The most efficient geometry for coining a ball of material into a radius edge 180 is when the included angle forming the radius edge 180 is bisected by a line going through the contact point of the ball and the center of the ball.

The smaller the included radius edge 180, the higher the depth to width ratio becomes. The cone angles chosen for the prototype seats, were preferred to give the most transparency to the existing design in terms of flow, seal diameter and dynamic performance. Others skilled in the art may use other angles may also give the above-mentioned advantages provided the included angle forming the radius edge 180 is bisected by a line going through the contact point of the carbide coining ball and the center of the carbide coining ball.

The orifice disk 150 is disposed proximate and downstream of the valve seat 60. The orifice disk 150 has at least one exit orifice 140 disposed between the proximate and distal surfaces of the orifice disk 150. The at least one exit orifice 140 is located on a virtual circle that defines an exit diameter about the longitudinal axis B-B.

When the closure member 40 is in the open position, the closure member 40 is raised above and separated from the sealing band 170 of valve seat 60, forming an annular opening therebetween, allowing pressurized fuel to flow therethrough and through the at least one orifice 140 to an intake manifold and therefrom to a combustion chamber (not shown) for combustion. Upon moving the closure member 40 to the closed position, closure member 40 engages the sealing band 170 of the valve seat 60, thus preventing the flow of fuel to the combustion chamber (not shown).

While the present invention has been disclosed with reference to certain embodiments, numerous modifications, alterations, and changes to the described embodiments are possible without departing from the sphere and scope of the present invention. Accordingly, it is intended that the present invention not be limited to the described embodiments and equivalents thereof.

The invention claimed is:

1. A method of lowering leakage rates in a fuel injector, the fuel injector having a body having an inlet, an outlet and a longitudinal axis; a valve assembly regulating the flow of fuel wherein a closure member rests on a valve seat in a closed position that prohibits the flow of fuel; an orifice disk having at least one orifice for allowing fuel to pass from valve assembly when closure member is biased into an open position, the method comprising:

providing a sealing surface of the valve seat having an upstream surface meeting a downstream surface to form a radius edge; and after the providing step, coining the sealing surface of the valve seat to create a concave sealing band surface onto the radius edge with the concave sealing band surface being coin fitted with an outer convex surface of the closure member so that a portion of the outer convex surface of the closure member conforms in a complementary mating manner with and engages the concave sealing band surface in the closed position, wherein an included angle of the upstream surface is greater than an included angle of the downstream surface thereby defining an included angle of the radius edge, the included angle of the radius edge being bisected by a line passing through a contact point of a closure member with the radius edge, and the center of the closure member, thereby bisecting the included angle of the radius edge into two equal angles.

2. The method of claim 1, wherein the upstream surface has a range of included angle from 120°-135° and a downstream surface has a range included angles from 90°-105° prior to the assembly of the fuel injector.

3. The method of claim 1, wherein the radius edge is convex in shape.

4. The method of claim 1, wherein a radius of the radius edge ranges from 0.005 mm to 0.150 mm.

5. The method of claim 1, the sealing band surface defines an oblique third contact surface of the valve seat.

6. The method of claim 1, wherein the sealing band surface defines a tangential relationship with a downstream end of the valve closure member.

7. The method of claim 1, wherein the sealing band surface width ranges from 0.05 mm to 0.20 mm.

8. The method of claim 1, wherein the closure member is shaped as a sphere or a truncated sphere.

9. A method of manufacturing a valve seat in a fuel injector, the fuel injector having a body having an inlet, an outlet and a longitudinal axis; a valve assembly regulating the flow of fuel wherein a closure member rests on a valve seat in a closed position that prohibits the flow of fuel; an orifice disk having at least one orifice for allowing fuel to pass from valve assembly when closure member is biased into an open position, the method comprising:

machining a sealing surface of the valve seat having an upstream surface meeting a downstream surface to form a radius edge, an included angle of the upstream surface is greater than an included angle of the downstream surface thereby defining an included angle of the radius edge, the included angle of the radius edge being bisected by a line passing through a contact point of the closure member with the radius edge, and the center of the closure member, thereby bisecting the included angle of the radius edge into two equal angles;

assembling a lower body of the fuel injector;

coining the sealing surface of the valve seat to create a concave sealing band surface onto the radius edge with the concave sealing band surface being coin fitted with an outer convex surface of the closure member so that a portion of the outer convex surface of the closure member conforms in a complementary mating manner with and engages the concave sealing band in the closed position; and displacing a closure member axially downwards onto the sealing band of the valve seat to seal the valve seat.

10. The method of claim 9, wherein machining a sealing surface further comprises turning, stamping or die casting a part.

11. The method of claim 9, wherein a carbide ball coins the sealing surface.

12. The method of claim 9, wherein the lower body of the fuel injector further comprises the valve seat, the closure member, the orifice disk, a lower guide, a lower screen, a lower tube, and a non-magnetic shell.

* * * * *